United States Patent
Park

(10) Patent No.: US 6,710,800 B1
(45) Date of Patent: Mar. 23, 2004

(54) DISPLAYING SYSTEM CAPABLE OF INTERNET COMMUNICATION AND CONTROL METHOD THEREOF

(75) Inventor: Ki-Seok Park, Seoul (KR)

(73) Assignee: Time & Space Tech. Co., Ltd., Seoul (KR)

( * ) Notice: Subject to any disclaimer, the term of this patent is extended or adjusted under 35 U.S.C. 154(b) by 0 days.

(21) Appl. No.: 09/292,970

(22) Filed: Apr. 16, 1999

(30) Foreign Application Priority Data

Apr. 22, 1998 (KR) .............................. 98-14305

(51) Int. Cl.$^7$ .................. H04N 5/225; H04N 5/232
(52) U.S. Cl. ................. 348/207.11; 348/211.3; 348/211.8; 348/207.1; 705/26
(58) Field of Search ................. 345/327, 330, 345/349, 972; 348/159, 142, 143, 149, 207.11, 211.3, 211.8, 207.1, 153, 150; 705/26

(56) References Cited

U.S. PATENT DOCUMENTS

| | | | | |
|---|---|---|---|---|
| 5,342,054 A | * | 8/1994 | Chang et al. | 473/156 |
| 5,565,908 A | * | 10/1996 | Ahmad | 725/93 |
| 5,644,643 A | * | 7/1997 | Scofield et al. | 382/110 |
| 5,971,273 A | * | 10/1999 | Vallaire | 235/381 |
| 5,990,938 A | * | 11/1999 | Bern | 348/152 |

* cited by examiner

Primary Examiner—Wendy R. Garber
Assistant Examiner—James Hannett
(74) Attorney, Agent, or Firm—Birch, Stewart, Kolasch & Birch, LLP

(57) ABSTRACT

A displaying system capable of Internet communication and a control method thereof. The invention is made such that a plurality of cameras photographing the displayed articles, at least one display rack including a communication module enabling communication by the Internet, and a communication control module for controlling the communicating operation of each display rack are provided, and when a user connected to the Internet wants a picture for a displayed article, letters of information or a real item picture of a displayed article and the like, a CPU of a display rack transmits picture information for a displayed article or letters of information to a user system through the Internet or else it transmits a real item picture of a displayed article photographed by a camera provided within the display rack to a user through the Internet, so that information for the displayed article and the real item picture can be provided through the Internet even though a user does not directly go to a general museum or exhibit room.

6 Claims, 6 Drawing Sheets

DISPLAYING SYSTEM CAPABLE OF INTERNET COMMUNICATION AND CONTROL METHOD THEREOF

TECHNICAL FIELD OF THE INVENTION

The present invention relates to a displaying system capable of Internet communication and a control method thereof, and more particularly to a displaying system capable of Internet communication and a control method thereof which is made such that when a user connected to Internet wants a picture of a displayed article, letters of information or a picture of a real item of a displayed article and the like, a CPU of a display rack transmits picture information for the displayed article or letters of information to a user system through the Internet, or else it transmits a real item picture of a displayed article photographed by cameras provided within the display rack to a user through Internet, so that information for a displayed article and real item picture can be provided through the Internet eve,n though a user does not directly go to a general museum or exhibit room.

PRIOR ART OF THE INVENTION

In general, a display rack is used for showing items to visitors by displaying antiquities or exhibits at a place such as museum, department store or other exhibiting room, and it is a real situation that most display rack displays exhibits within an interior of a case made entirely of glass.

However, since most display racks have no communication function, there has been a problem in that a visitor intending to see the exhibited articles had to go directly to a museum or exhibit room caused added inconvenience, and since various information for the displayed articles are shown at a front surface or side surface of the display rack, there has been a problem in that the information for the displayed articles, for instance, large quantities of information such as historical background for particular antiquities, or characteristics of a picture and shapes of similar articles could not be provided to the visitor.

SUMMARY OF THE INVENTION

Therefore, the present invention is directed to solving the above described problems, and it is an object of the present invention to provide a displaying system capable of Internet communication and a control method thereof which is made such that a plurality of cameras photographing the displayed articles, at least one display rack including a communication module enabling communication by Internet, and a communication control module for controlling the communicating operation of each display rack are provided, and when a user connected to Internet wants a picture for a displayed article, letters of information or a picture of the real item of a displayed article and the like, a CPU of a display rack transmits picture information for a displayed article or letters of information to a user system through the Internet or else it transmits a picture of a real item of a displayed article photographed by a camera provided within the display rack to a user through Internet, so that information for the displayed article and real item picture can be provided through the Internet even though a user does not directly go to a general museum or exhibit room.

In order to attain the above object, the present invention comprises: in a display rack including a case which is formed by glass all around and made to display particular articles within an interior thereof, at least one display rack which includes first and second cameras which are provided to be able to move in horizontal and vertical directions within a display rack, and photographing in response to control signal thereby outputting their image signals, an image combining means which combines two images outputted from the first and second cameras to be simultaneously outputted to one screen, an image compressing means which compresses outputting image signal of the image combining means via MPEG (Motion Picture Expert Group) and outputs to a CPU, first and second memories for storing image information and letters of information for the displayed articles, a communication module which enables data transmitting and receiving with the user system through Internet, and a CPU for controlling each constituting element so that a transmitting operation of a driving to horizontal and vertical directions of the first and second cameras, or image and letters of information for displayed articles and a real item picture for a displayed article compressed at the image compressing means, and which have respectively different communication ID and connected to Internet;

a relaying means which relays transmitting and receiving data so that said multiplicity of display racks can make data communication with a user through the Internet; and a communication module which monitors what said multiplicity of display racks communicate through Internet through the relaying means, and controls the Internet communication of each display rack to be normally made.

The control process of above described hardware construction is proceeded by:

an initial connecting step in which when power is inputted, a CPU of each display rack connects to the Internet by a utilizing respectively set ID, and the communication control module checks a communication state of each CPU;

a user information requesting step in which a user connects to the Internet and selects any one display rack, and requests image information for a displayed article, letters of information, or real item pictorial image information to a selected display rack;

an information transmitting step in which a CPU of a corresponding display rack which received an information request of a user transmits the image and letters of information stored in memory to a user through the Internet or else moves respectively positions of first and second cameras to horizontal and vertical directions and photographs the displayed article and then transmits it to the user in response to the control demand of user; and a monitoring step in which the communication control module monitors what each display rack and user system communicates through the Internet through the relay means during each step.

DETAILED DESCRIPTION OF THE INVENTION

Figure 1:
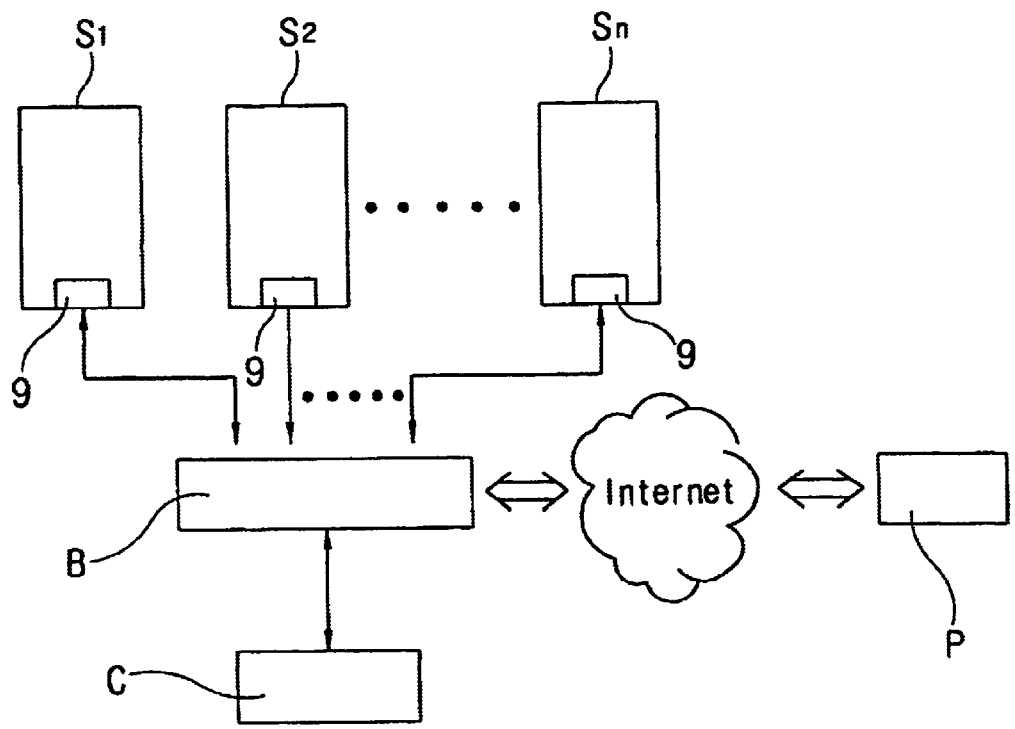
FIG. 1 is a block diagram showing a displaying system of the present invention.
Figure 2:
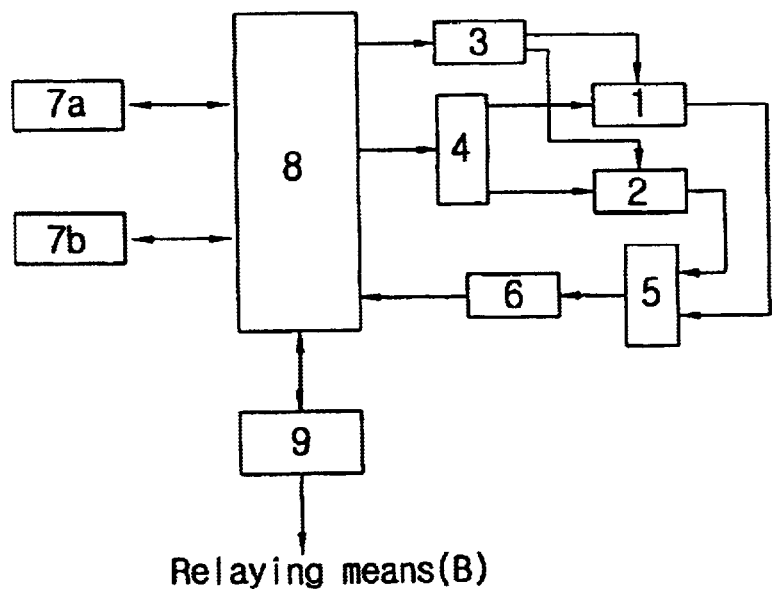
FIG. 2 is an interior block diagram of the display rack applied with the present invention.

Hereinafter, a preferred embodiment of the present invention will be described in more detail with reference to the accompanying drawings from FIG. 1 to FIG. 8.

Reference numeral symbols S1–Sn show the display racks for displaying particular displaying articles, and horizontal and vertical conveyor rails 31, 32 having guide groove 41 and hollow 42 are provided to a top surface and one side surface of case 11 which is formed by glass on all sides and made to display particular articles within an interior thereof, and first camera 1 is provided to the horizontal conveyor rail 31 and second camera 2 to the vertical conveyor rail 32 so that the first and second cameras move on the conveyor rails in response to the control of the conveying means 3 so as to photograph the displayed articles.

Figure 4:
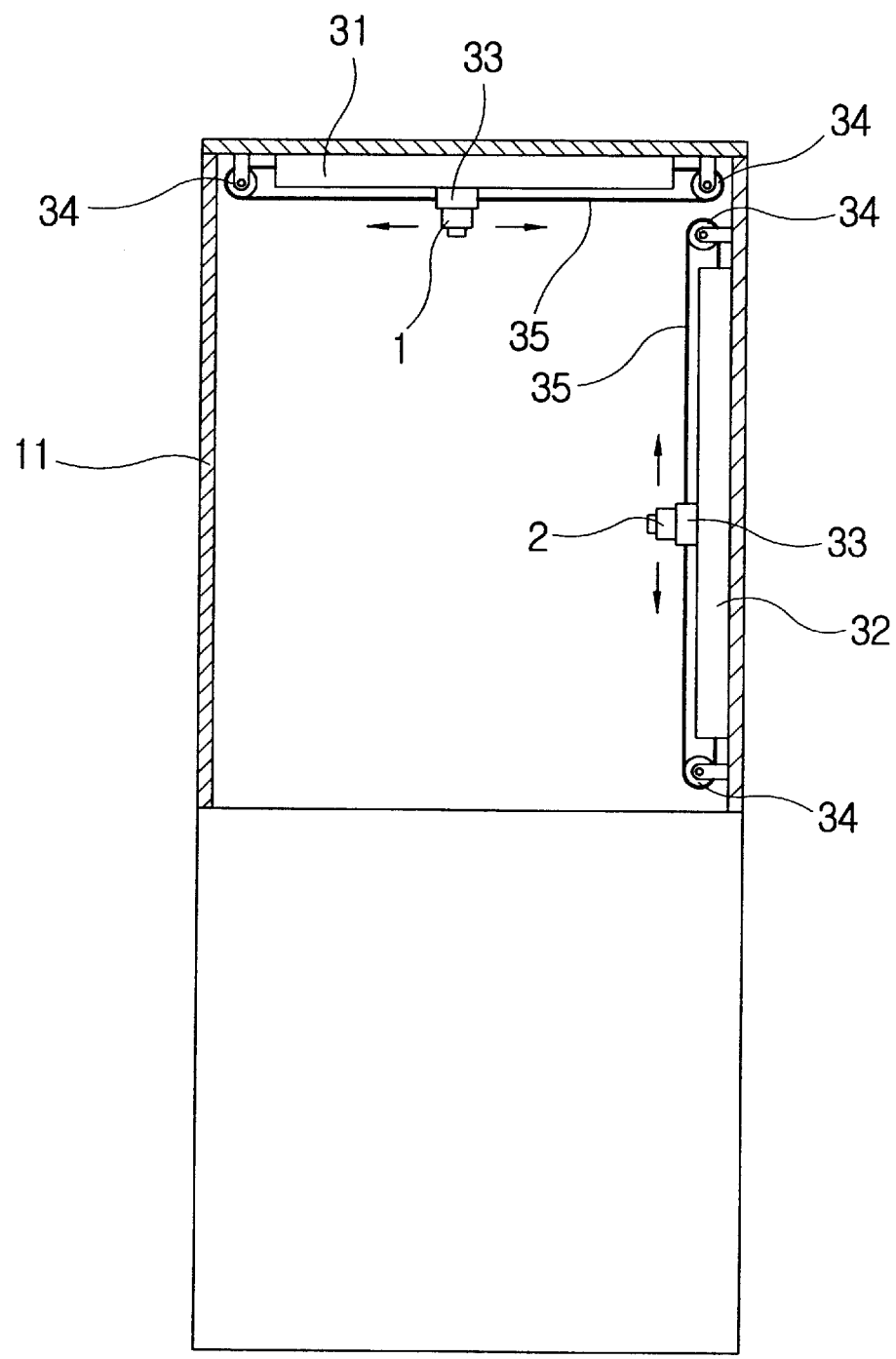
FIG. 4 is a view showing a state that cameras are provided to the display rack.
Figure 5:
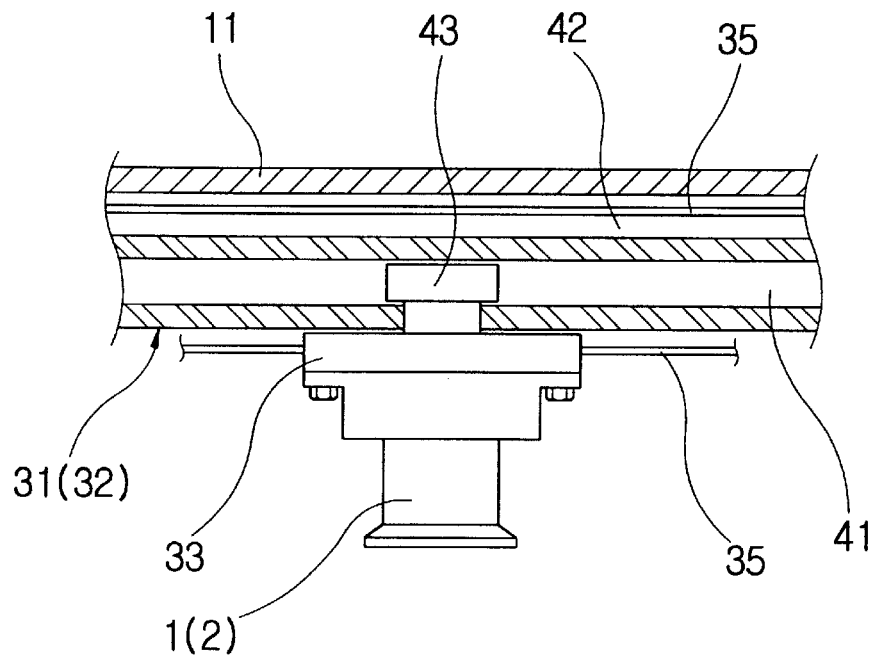
FIG. 5 is a side cross sectional view showing a conveying means of the present invention.
Figure 6:
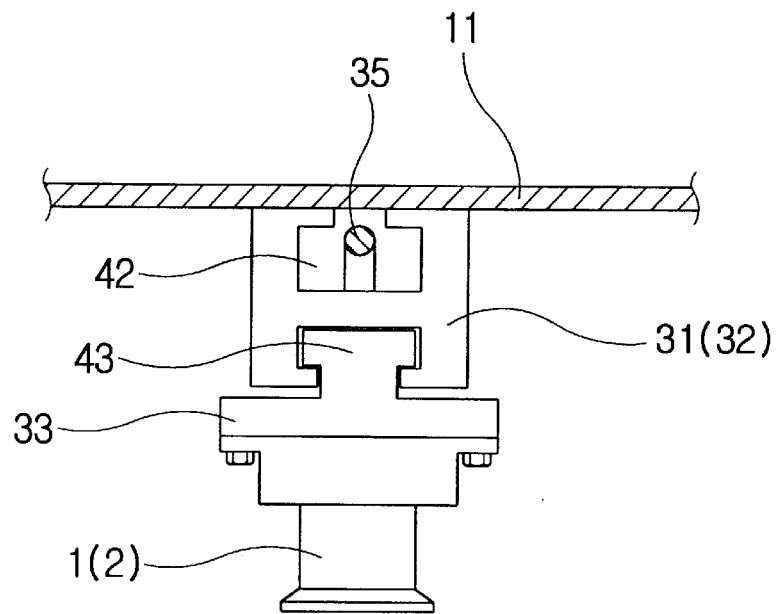
FIG. 6 is a front cross sectional view showing a conveying means of the present invention.
Figure 7:
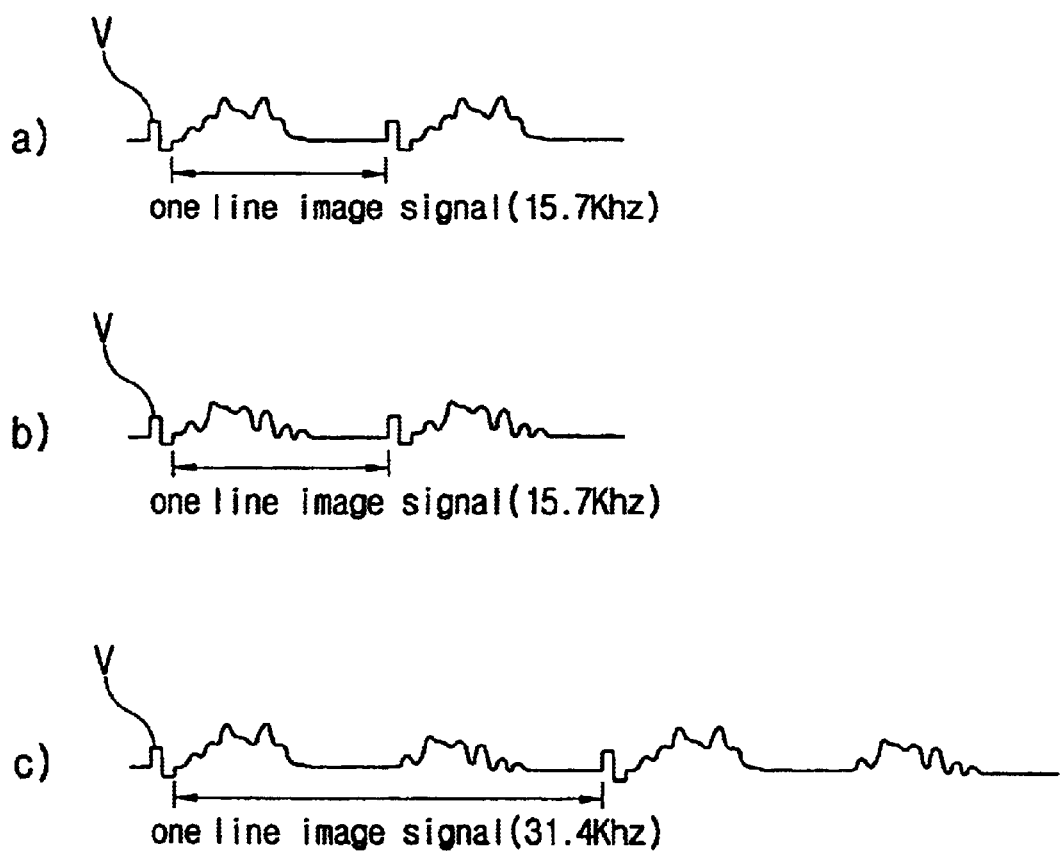
FIGS. 7a–7c are wave form charts illustrating output wave forms of the image combining means.

In accordance with a combination of the conveyor rails 31, 32 and the camera 41, as shown in FIG. 4 and FIG. 5, a conveying plate 33 is provided which is formed with guiding block 43 coupled to the guide groove 41 of the conveyor rails 31, 32 and sliding thereon, and a conveying rope 35 is provided to both sides of the conveying plate 33 which rotates by winding around rotating roller 34 formed at both ends of the conveyor rails 31, 32, and a motor which is not shown is provided to the rotating roller 34 at one side, and at the time of driving of the motor, the conveying rope 35 is moved so as to move the conveying plate 33.

The motor is driven by control of the CPU 8.

The photographing operation of the first and second cameras 1, 2, that is, zooming in, zooming out, and focusing operations are realized in response to the control of camera server 4, and two image signals photographed at each cameras 1, 2 are combined into one picture by an image combining means 5, and an image compressing means 6 compresses the image signal combined to one picture and outputs it to CPU 8 at an after stage of the image combining means.

The image combination of the image combining means 5 is made by combining the output image of each cameras 1, 2 photographed by an NTSC system of which a horizontal frequency of the image signal is approximately 15.7 KHz to an image signal of a monitor of which a horizontal frequency is approximately 31.4 KHz, and the combined output image of cameras 1, 2 is outputted respectively at right and left sides among one screen of the monitor.

Figure 3:
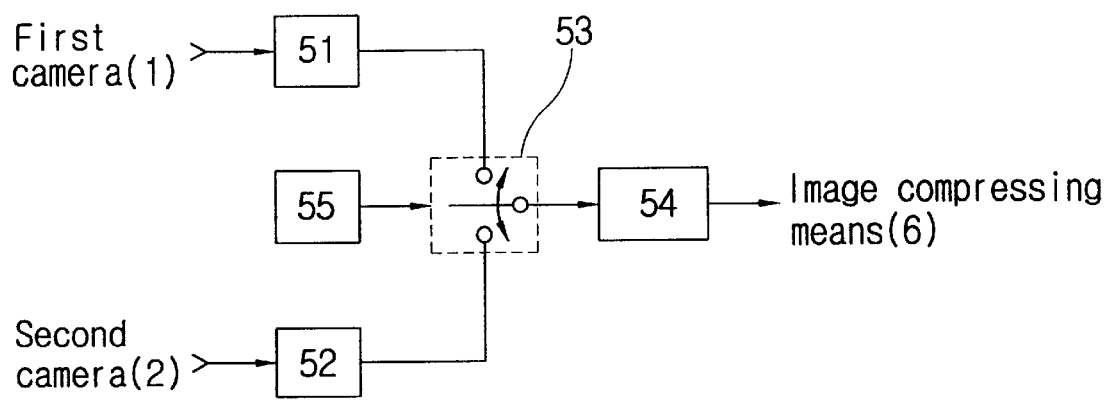
FIG. 3 is a block diagram showing an image combining means of the display rack.

The image combining means 5 comprises (as shown in FIG. 3) line memories 51, 52 for storing by receiving the image signal photographed via an NTSC system by first and second cameras 1, 2 by one line, a switch 53 for switching the output image of the line memories 51, 52 by switching at every predetermined period, a combiner 54 for combining by receiving the output image of the switch 53 to the image signal for monitor of which a horizontal frequency is 31.4 KHz, and a switching control means 55 for so controlling that the switch 53 is switched at every previously set predetermined period.

Each display racks S1–Sn includes a memory 7a storing the image information for a displayed article and a memory 7b storing letters of information for the displayed article, and the image information is stored with an outlook feature for a displayed article and information for similar articles while the letters of information is stored with a historical background or some other feature a for displayed article.

Reference numeral symbol 8 depicts a CPU actually communicating with user system P through the Internet, and the CPU connects to the Internet by utilizing a previously set proper ID, and reads out the image information or letters of information for a displayed article stored in the memories 7a, 7b in accordance with a user's information demand inputted through the Internet, and thereby either transmits to a user or enables to convey the cameras 1, 2 to horizontal and vertical directions through the conveying means 3, and controls a photographing operation for a displayed article of cameras 1, 2 through camera server 4 and then receives the image for the displayed article photographed by cameras 1, 2 whereby it is provided to the user.

The CPU 8 is connected to Internet through communication module 9 whereby it executes data transmitting and receiving with user system P.

On the other hand, a reference numeral symbol B denotes a relaying means, and the relaying means B connects the Internet and the communication module 9 provided to a number of display racks S1–Sn, so that each of display racks S1–Sn normally makes data communication with a user system through the Internet, a reference numeral symbol C denotes a communication control module, and the communication control module C has ID information for each of display racks S1–Sn, and monitors the communication state of each of display racks S1–Sn through the relaying means B at a time when the display rack S1–Sn communicates.

In a process of monitoring by the communication control module C, when any display rack demands to confirm whether or not a present communication state is normal, the communication module C executes a function for informing whether or not the communication state of a corresponding display rack is normal by retrieving the monitored data.

Figure 8:
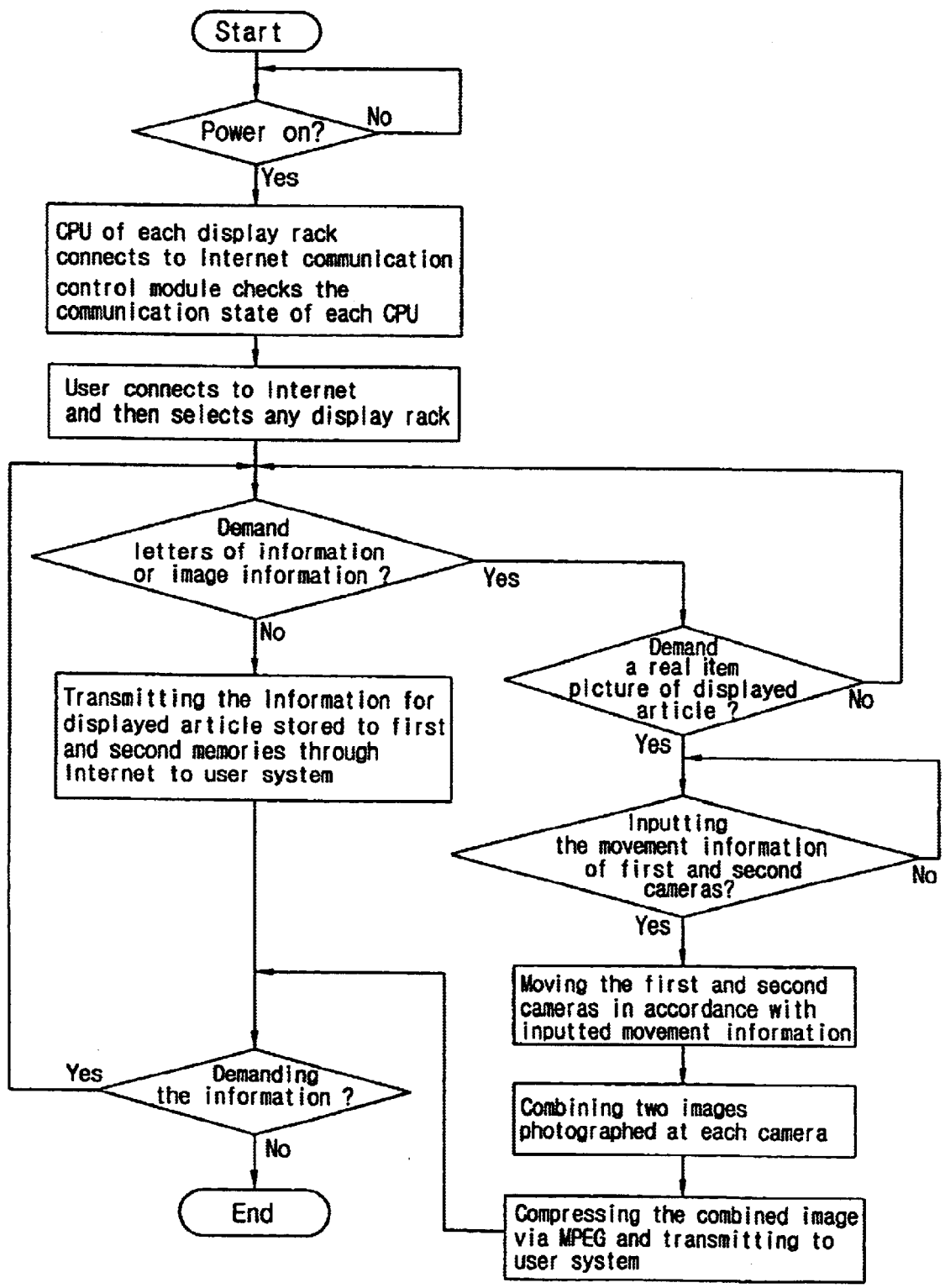
FIG. 8 is a flow chart illustrating a control process of the present invention.

Operation and effect of the present invention constructed as above will be described by each step with reference to flow chart of FIG. 8.

Initial Connecting Step

The initial connecting step is a step by which a number of display racks S1–Sn set at a museum, department store or display room are connected to Internet.

That is, when power is inputted, the CPU of each of display racks S1–Sn connects to the Internet through the communication module 9 by utilizing respectively established proper Internet connecting IDs, and the communication control module C checks the communication state of each display rack S1–Sn connected to Internet through the relaying means B.

The communication state checking of the communication module C is to check whether or not each display rack S1–Sn is connected to the Internet by a correct ID, and to check whether or not a level of data transmitted and received mutually between each display rack S1–Sn and the Internet is normal.

User Information Demanding Step

The user information demanding step is a step by which a user selects any display rack S1–Sn after connecting to Internet by utilizing system P, and demands image information, letters of information for a displayed article, or real video information of a desired portion of a displayed article to the selected display rack.

Information demanded of user is supplied to the CPU 8 of a corresponding display rack through Internet.

Information Transmitting Stop

The information transmitting step is a step for transmitting the information demanded by a user through Internet.

That is, if a user demands image information for a displayed article, the CPU 8 reads out various image information for the displayed article and transmits to user system P through the communication module 9, and if a user demands letters of information for a displayed article, the CPU 8 reads out various letters of information for the displayed article and transmits to user system P through the communication module 9.

On the other hand, if a user demands a real article picture of a displayed article, the CPU 8 causes production of a photograph of the displayed article by driving the cameras 1, 2 through the camera server 4.

The image signal for a displayed article photographed at the cameras 1, 2 is supplied respectively to the image combining means 5 whereby it is combined to an image signal of which a horizontal frequency is approximately 31 KHz fitted to a screen size of monitor and then compressed via MPEG by the image compressing means 6 and supplied to CPU 8. The image combining process of the image combining means 5 will be described more in detail as below.

First, the image signal (refer to FIG. 7*a*) of one line among the image signals photographed at first camera 1 is stored to a line memory 51, the image signal (refer to FIG. 7*b*) of one line among the image signals photographed at second camera 2 is stored to another line memory 52, and the switch 53 executes switching operation in accordance with control signal of the switching controller 55 whereby it makes the output image of the line memories 51, 52 to be outputted alternately.

The image signal outputted from the switch 53 combined at the combiner 54 and outputted to the image compressing means 6, and the image signal combined at the combiner 54 becomes coexistent with the image signal of one line photographed at first camera 1 and the image signal of one line photographed at second camera 2 at an after stage of a vertical synchronizing signal as shown in FIG. 7*c*, and when the image combining process as above is successively progressed and the images of one line are combined, its image is made such that an image photographed at first camera 1 is outputted to a left side while an image photographed at second camera 2 is outputted to a right side within one screen of a monitor, and thereby a user can be simultaneously provided with two images for the displayed article by one screen.

On the other hand, the image signal photographed at the image compressing means 6 is supplied to the CPU 8, and the CPU 8 transmits the image signal inputted from the image compressing means 6 to user system P connected to Internet through the communication module 9, so that the user can be supplied with a real image for a displayed article demanded by a user through Internet.

Meanwhile, in a state that a user demands a real image for a displayed article and the real image of displayed article is outputted to system P, when the user inputs a particular key provided to the system P, the first 1 camera and second camera 2 are moved in horizontal or vertical direction in response to its input information whereby it is made to photograph many portions of a displayed article from various angles.

That is, when a user inputs a particular key of the system P and commands the first camera 1 to move to a right or left direction, the CPU 8 inputted with this command drives a motor (not shown) of the conveying means 3 and rotates the conveying rope 35 whereby a guiding block 43 of the conveying plate 33 is moved to right and left directions on a guide groove 41 of the conveyor rail 31 and thereby the first camera 1 is moved in right and left directions, and when the user inputs a particular key of the system P whereby it commands to move the second camera 2 to top and bottom directions, the CPU 8 receives this command and drives the conveying means 3 whereby the second camera 2 moves in top and bottom directions on the conveyor rail 32.

Since the first and second cameras 1, 2 successively photograph the displayed article even during moving in horizontal and vertical directions, the user can see other parts of the displayed article in response to movement of the cameras 1, 2.

Monitoring Step

The monitoring step is performed when the communication control module C monitors the communication state when each display rack S1–Sn communicates with user system P through the Internet, and the communication control module C monitors the communicating state of each display rack through the relaying means B when each display rack S1–Sn executes data communication with user system P through the Internet.

On the other hand, the CPU 8 of each display rack confirms to the communication control module C whether or not the communication with a presently executing user system is normal at every previously set predetermined period during communication with user system P, and the communication control module C retrieves the monitored data and informs whether or not there is a communication error of a corresponding CPU 8.

Thus, when the communication error presence or absence is given or taken between the CPU 8 and the communication control module C, a reliability for data communication between each display rack and the user system P is furthermore improved.

As described above, an effect of the present invention is to provide a displaying system capable of Internet communication and a control method thereof which is made such that a plurality of cameras photographing the displayed articles, at least one display rack including a communication module enabling communication by Internet, and a communication control module for controlling the communicating operation of each display rack are provided, and when a user connected to Internet wants a picture for a displayed article, letters of information or a real item picture of a displayed article and the like, a CPU of a display rack either transmits picture information for a displayed article or letters of information to a user system through the Internet or else it transmits a real item picture of a displayed article photographed by a camera provided within the display rack to a user through the Internet, so that information for the displayed article and the real item picture can be provided through the Internet even though a user does not go directly to a general museum or exhibit room.

What is claimed is:

1. In a display rack including a case which is formed by glass on all sides and made to display particular articles within an interior thereof, a displaying system capable of Internet communication comprising:

at least one display rack S1–Sn which includes first and second cameras 1, 2 which are provided to be able to move in horizontal and vertical directions within a display rack, and photographing in response to a control signal, thereby outputting their image signals, an image combining means 5 which combines two images outputted from the first and second cameras to be simultaneously outputted to one screen, an image compressing means 6 which compresses an outputted image signal of the image combining means via MPEG and outputs to a CPU, first and second memories 7a, 7b for storing image information and letters of information for the displayed articles, a communication module 9 which enables data transmitting and receiving with user system P through the Internet, and a CPU 8 for controlling each constituting element so that a transmitting operation of driving in horizontal and vertical directions of the first and second cameras 1, 2, or image and letters of information for displayed articles and a real item picture for a displayed article compressed at the image compressing means 6, and which have respectively different communication IDs and is connected to the Internet;

a relaying means B which relays transmitting and receiving data so that said at least one display rack S1–Sn can make data communication with a user through the Internet; and a communication module C which monitors what said at least one display rack S1–Sn communicates through the Internet through the relaying means B, and controls the Internet communication of each display rack to be normally made.

2. A displaying system capable of Internet communication as defined in claim 1, wherein said image combining means 5 comprises line memories 51, 52 for storing by receiving the image signal photographed via an NTSC system by first and second cameras 1, 2 by one line, a switch 53 for switching the output image of the line memories 51, 52 by switching at every predetermined period, a combiner 54 for combining by receiving the output image of switch 53 to the image signal for monitoring of which horizontal frequency is 31.4 KHz, and a switching control means 55 for so controlling that the switch 53 is switched at every previously set predetermined period.

3. A displaying system control method capable of Internet communication proceeded by:

an initial connecting step in which when power is inputted, the CPU of at least one display rack connects to the Internet by utilizing respectively set IDs, and a communication control module checks a communication state of each CPU;

a user information requesting step in which a user connects to the Internet and selects any one of at least one display rack, and requests image information for a displayed article, letters of information, or real item pictorial image information to a selected display rack;

an information transmitting step in which a CPU of a corresponding display rack which receives an information request of a user, transmits the image and letters of information stored in memory to a user through the Internet, and moves respectively positions of first and second cameras in horizontal and vertical directions and photographs the displayed article, and then transmits the image signal of the photographs to a user over the Internet in response to the control demand of the user; and a monitoring step in which the communication control module monitors what at least one display rack and a user system communicates through Internet through a relay means during each step.

4. A displaying system control method capable of Internet communication as defined in claim 3, wherein the image signal transmission photographed at the first and second cameras 1, 2 at said information transmitting step is proceeded by:

a step which combines one line of image signal photographed at first camera 1 and one line of image signal photographed at second camera 2 and thereafter combines by line the image signal photographed at each camera by the same method thereby creating a combined image signal of one field, and a step for compressing the combined image signal made at said step via MPEG thereby transmitting it to a user system through the Internet.

5. A displaying system control method capable of Internet communication as defined in claim 3, wherein the CPU 8 of at least one display rack S1–Sn confirms whether or not the communication with a presently executing user system is normal at every previously set predetermined period during communication of the user system, and the communication control module C retrieves monitored data whereby it informs of the presence or absence of a communication error of corresponding CPU 8.

6. A display system control method capable of Internet communication as defined in claim 4, wherein the CPU 8 of each display rack S1–Sn confirms whether or not the communication with the presently executing user system is normal at every previously set determined period during communication of said user system, and the communication control module C retrieves monitored data whereby it informs of the presence or absence of a communication error of corresponding CPU 8.

* * * * *